US012763061B2

(12) United States Patent
Papp

(10) Patent No.: US 12,763,061 B2
(45) Date of Patent: Oct. 13, 2026

(54) METHOD FOR ANALYZING SOUNDS WITHIN VEHICLE INTERIOR AND TRANSMITTING CORRESPONDING DRUMKIT SOUNDS OVER SPEAKERS OF VEHICLE

(71) Applicant: Dr. Ing. h.c. F. Porsche Aktiengesellschaft, Stuttgart (DE)

(72) Inventor: Ethan Papp, Union City, CA (US)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 150 days.

(21) Appl. No.: 18/444,856

(22) Filed: Feb. 19, 2024

(65) Prior Publication Data

US 2025/0266031 A1 Aug. 21, 2025

(51) Int. Cl.
*G10K 15/04* (2006.01)
*G10H 1/00* (2006.01)

(52) U.S. Cl.
CPC ........... *G10K 15/04* (2013.01); *G10H 1/0008* (2013.01); *G10H 2220/211* (2013.01)

(58) Field of Classification Search
None
See application file for complete search history.

(56) References Cited

U.S. PATENT DOCUMENTS

| | | | | |
|---|---|---|---|---|
| 2009/0287323 | A1 | 11/2009 | Kobayashi | |
| 2010/0282045 | A1* | 11/2010 | Chen | G10H 1/40 84/612 |
| 2014/0107864 | A1* | 4/2014 | Cecchini | G06F 17/00 701/1 |
| 2014/0328487 | A1 | 11/2014 | Hiroe | |
| 2015/0294656 | A1 | 10/2015 | Hanuschak | |
| 2016/0093278 | A1* | 3/2016 | Esparza | G10H 3/12 84/730 |
| 2023/0321533 | A1* | 10/2023 | Varela | B60K 35/22 |

FOREIGN PATENT DOCUMENTS

| | | | |
|---|---|---|---|
| DE | 102016208095 | A1 | 11/2017 |
| JP | 2018017806 | A | 2/2018 |

* cited by examiner

*Primary Examiner* — Quynh H Nguyen
(74) *Attorney, Agent, or Firm* — Buchanan Ingersoll & Rooney PC

(57) ABSTRACT

A computer-implemented method and computer program product for capturing sounds caused by a user of a vehicle and transmitting corresponding sounds over speakers of the vehicle. The method includes the steps of: (a) connecting a software application to a vehicle network; (b) capturing a user-generated sound caused by an impact of the user on a component of a vehicle interior; (c) analyzing the captured user-generated sound and associating the user-generated sound with a recorded drum sound; and (d) playing the recorded drum sound over the speakers of the vehicle. The computer program is configured to perform the aforementioned steps.

16 Claims, 4 Drawing Sheets

METHOD FOR ANALYZING SOUNDS WITHIN VEHICLE INTERIOR AND TRANSMITTING CORRESPONDING DRUMKIT SOUNDS OVER SPEAKERS OF VEHICLE

TECHNICAL FIELD

The present subject matter relates to a system and method for analyzing sounds within a vehicle interior and transmitting corresponding drum sounds over the vehicle speakers.

BACKGROUND

The modern automobile in recent years has seen a massive expansion in the number of internal electronic control, infotainment, and driving assistance systems. The use of mobile and wearable electronic devices also continues to increase. Most automobiles are capable of communicating with a smartphone carried by, or a smartwatch worn by, a driver or a passenger in the vehicle. For example, a smartphone is configured to communicate with an Apple CarPlay software system within the vehicle. With the rapid development of mobile technologies, users have higher demands for the convenience of use of in-vehicle software applications (e.g., "apps"). Currently, users can either use an original in-vehicle application provided by the vehicle manufacturer or connect a smartphone to the vehicle onboard computer, and then project an app installed on the smartphone onto the vehicle display screen through Apple CarPlay, Android Auto, CarLife, or other software connectivity protocols.

As is described in U.S. patent application Ser. No. 18/219,933, which is incorporated by reference herein in its entirety, vehicle functions (e.g., vehicle audio and video, vehicle window control, climate control, vehicle lighting, etc.) are integrated within the CarPlay app to create an innovate, personalized experience for the vehicle driver and passengers. Accordingly, the driver and passengers can control various in-vehicle functions via a connected smartphone because the smartphone is connected to the in-vehicle CarPlay app, the CarPlay app is integrated within the vehicle infotainment system, and the vehicle infotainment system is interconnected with the in-vehicle network of controllers, sensors and computers.

Most users use the vehicle infotainment system or different apps running on mobile or wearable devices for playing music, particularly during a long drive. Advancements in the area of user entertainment are continually sought in the interests of fun, convenience, performance, and safety. Described herein is an entertainment systems which can safely entertain the user of a vehicle and allow the user to add sounds to the music played in the vehicle, without much effort or distraction from driving, thereby enhancing the in-vehicle user experience.

SUMMARY OF INVENTION

Described herein are a method and a computer program product for capturing sounds caused by a user of a vehicle and transmitting corresponding sounds over speakers of the vehicle, thereby enhancing the in-vehicle experience. The method includes the steps of: (a) connecting a software application to a vehicle network; (b) capturing at least one user-generated sound caused by an impact of the user on a component of a vehicle interior; (c) analyzing the captured user-generated sound and associating the user-generated sound with at least one recorded drum sound; and (d) playing the at least one recorded drum sound over the speakers of the vehicle. The computer program product is configured to perform the aforementioned steps.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
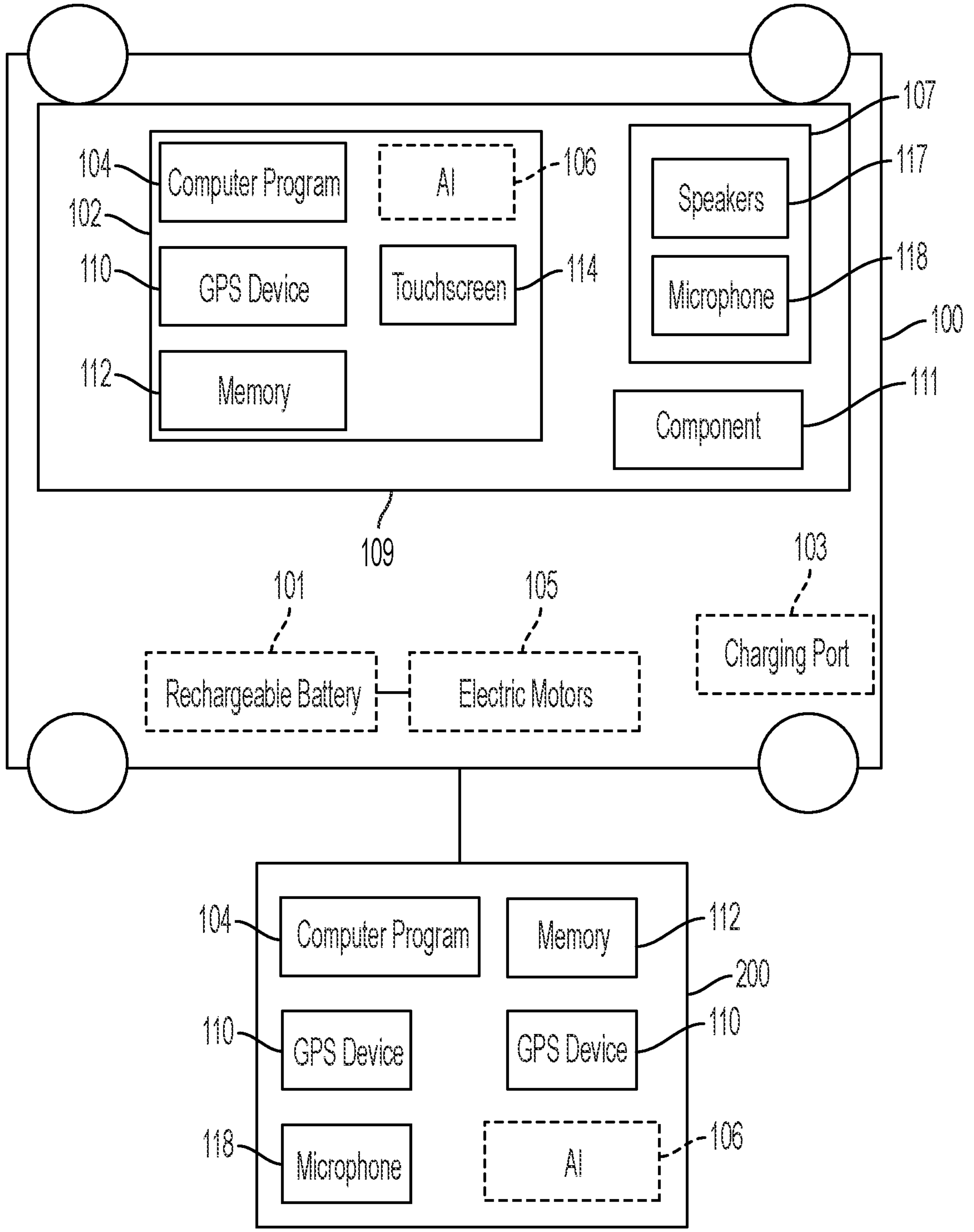
FIG. 1 depicts a schematic diagram of a vehicle and a mobile device connected to the vehicle.
Figure 2:
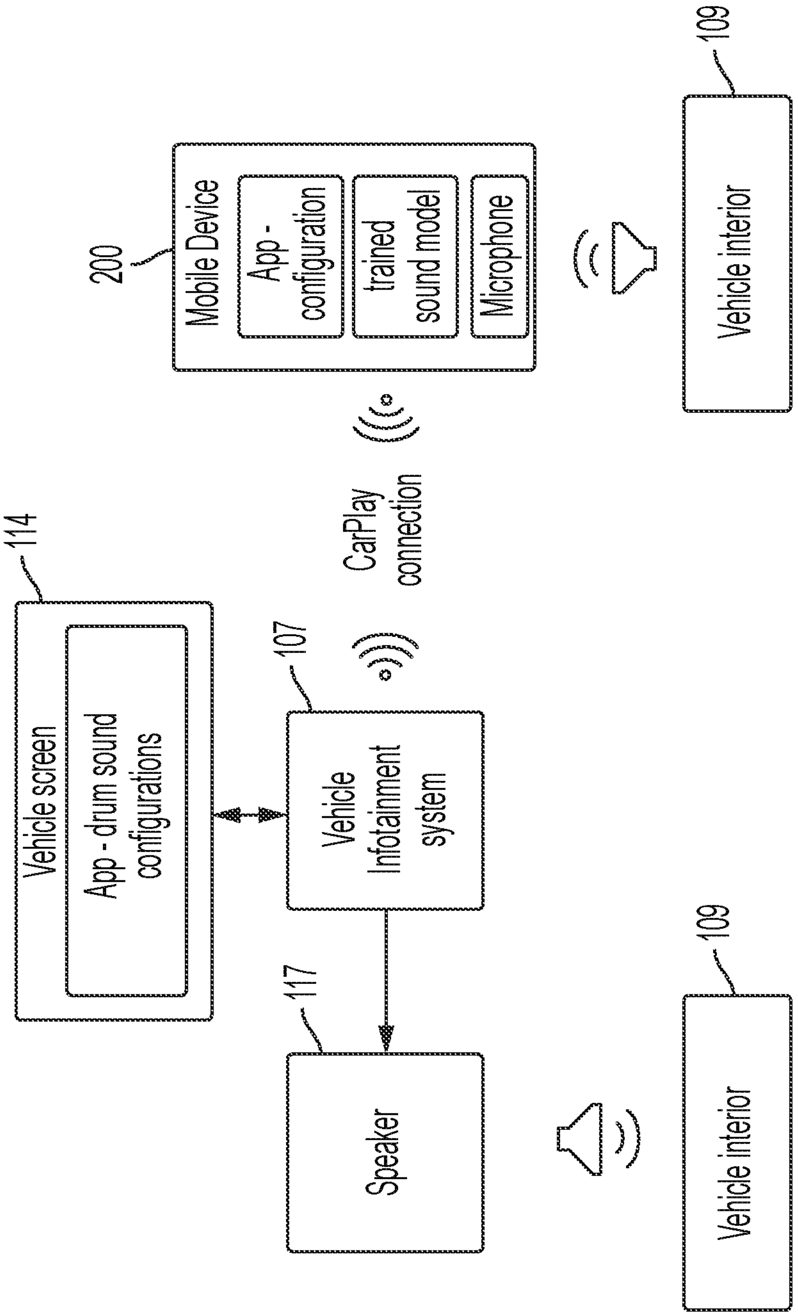
FIG. 2 depicts a schematic diagram of a system including a vehicle and a mobile device for capturing sounds caused by a user of a vehicle and transmitting corresponding sounds over speakers of the vehicle.

FIG. 1 depicts a vehicle 100. The vehicle 100 can be an electric vehicle having a rechargeable battery 101, a charging port 103 used for charging the battery 101, and one or more electric motors 105

Regardless of the type of vehicle 100, vehicle 100 has a computer 102 for controlling functions related to the operations of vehicle 100 and an infotainment system 107 including audio speakers 117, a smartphone mirroring system app (e.g., CarPlay), an optional microphone 118, navigation, telematics, internet access, etc. Infotainment system 107 may be considered as forming part of computer 102. An electronic mobile device 200 (otherwise referred to herein as a smartphone) is connected to vehicle computer 102 via a wired or wireless connection (e.g., Wi-Fi, cellular or Bluetooth connection). It is noted that components that are shown in broken lines in FIG. 1 are optional.

Vehicle computer 102 includes a processor, a visual display 114 having means for both inputting data and displaying data (e.g., touchscreen), a transmitter/receiver for communicating with mobile device 200 in a conventional manner, and a GPS device 110. For example, vehicle computer 102 may send and receive data via Wi-Fi or 4G/LTE radios built into vehicle 100, by way of example. Mobile device 200 includes a processor, a visual display having means for both inputting data and displaying data (e.g., touchscreen), a transmitter/receiver for communicating with vehicle 100 in a conventional manner, and a microphone 118.

The interior 109 of vehicle 100 includes at least one component 111, such as a steering wheel, a center console, a dashboard, door panels, speaker surrounds, and/or the floor of the vehicle 100, for example. The microphone 118 of the mobile device 200 can be configured to capture sounds caused by an impact of the user (e.g., striking by a hand, tapping with fingers, tapping with feet, etc.) on a component 111 of the vehicle interior 109.

Alternatively, sounds caused by an impact of the user (e.g., striking by a hand, tapping with fingers, tapping with feet, etc.) on a component 111 of the vehicle interior 109 can be captured by the microphone 118 of the infotainment system 107 of the vehicle 100.

Turning back to FIG. 1, a computer program 104 or a software application (e.g., "app") is downloaded to, installed on, and stored in, either electronic mobile device 200 or computer 102 of vehicle 100 (or both). According to one embodiment, program 104 is stored within the mobile device 200; information can be inputted into program 104 via the display of mobile device 200; and information can be outputted from program 104 via the display of vehicle computer 102 (e.g., via Apple CarPlay or Android Auto). According to another embodiment, program 104 is stored within the vehicle computer 102; information can be inputted into program 104 via the touchscreen display of vehicle computer 102; and information can be outputted from program 104 via the display of vehicle computer 102 (e.g., via Apple CarPlay or Android Auto). According to yet another embodiment, program 104 is a mobile application stored within the mobile device 200; information can be inputted into program 104 via the display of mobile device 200; and information can be outputted from program 104 via the display of mobile device 200. According to still another embodiment, program 104 is stored within the mobile device 200; information can be inputted into program 104 via the display of mobile device 200; and information can be outputted from program 104 via both the display of mobile device 200 and the display of vehicle computer 102.

In certain embodiments, users of the vehicle 100 may be identified by program 104 based on paired device data maintained in the memory 112 of program 104. The paired device data can indicate, for example, unique device identifiers of mobile devices that were previously paired with program 104 of the vehicle 100, such that program 104 may automatically reconnect previously connected mobile devices without user intervention.

In certain embodiments, program 104 can be configured to interact with an AI chatbot model, such as ChatGPT, for example, which can run as a third-party software application (e.g., "app") AI 106 on vehicle computer 102 or on the mobile device 200 of the user of the vehicle 100. In other embodiments, the AI model can be a different AI-enabled software application 106 running on vehicle computer 102 or on the mobile device 200 of the user of the vehicle 100. Program 104 can be configured to interact with the AI model or ChatGPT app 106 and use ChatGPT's API to perform an action (e.g., query) specified by the user. Further details of the AI model are described in U.S. patent application Ser. No. 18/201,799 filed on May 25, 2023, which is incorporated by reference herein in its entirety and for all purposes.

Program 104 can be designed and configured to connect directly to the network of the vehicle 100 and/or a third-party software applications (e.g., other "apps") or devices via a direct connection application programming interface (API). For example, program 104 can be configured to interact with other apps installed on vehicle computer 102, such as different apps for social media, messaging, providing maps and navigation, playing music or podcasts, etc., that may be installed on, and be available via the display of, vehicle computer 102 (e.g., via Apple CarPlay or Android Auto), for example, or with other similar apps installed on mobile device 200. In these situations, because these apps are integrated with program 104, program 104 can use each specific app's API to perform an action specified by the user.

In certain embodiments, program 104 can appear as a selectable icon within Apple CarPlay. Program 104 can be configured to connect the network of the vehicle 100 with the Apple ecosystem (e.g., with the different Apple devices, such as iPhone, iPad, MacBook, Apple Watch, AirPods, Apple TV, Apple CarPlay, etc.) that may be connected and integrated with each other, and that may be accessible within the vehicle 100. Once connected to the Apple ecosystem, program 104 can run in the background of Apple CarPlay, for example.

The network of the vehicle 100 can include one or more of a vehicle controller area network ("CAN") or an Ethernet network, for example. The network of the vehicle 100 can allow, after proper and successful authentication, program 104 to communicate with various systems or components of vehicle 100, such as a vehicle modem (if available), GPS device 110 and various electronic control units ("ECUs") configured to interface with program 104. For example, the vehicle ECUs may include a vehicle interior control module configured to monitor and control power control functions, such as infotainment system 107, for example; a radio transceiver module configured to provide radio services and communicate with mobile devices inside vehicle 100; etc.

Figure 3:
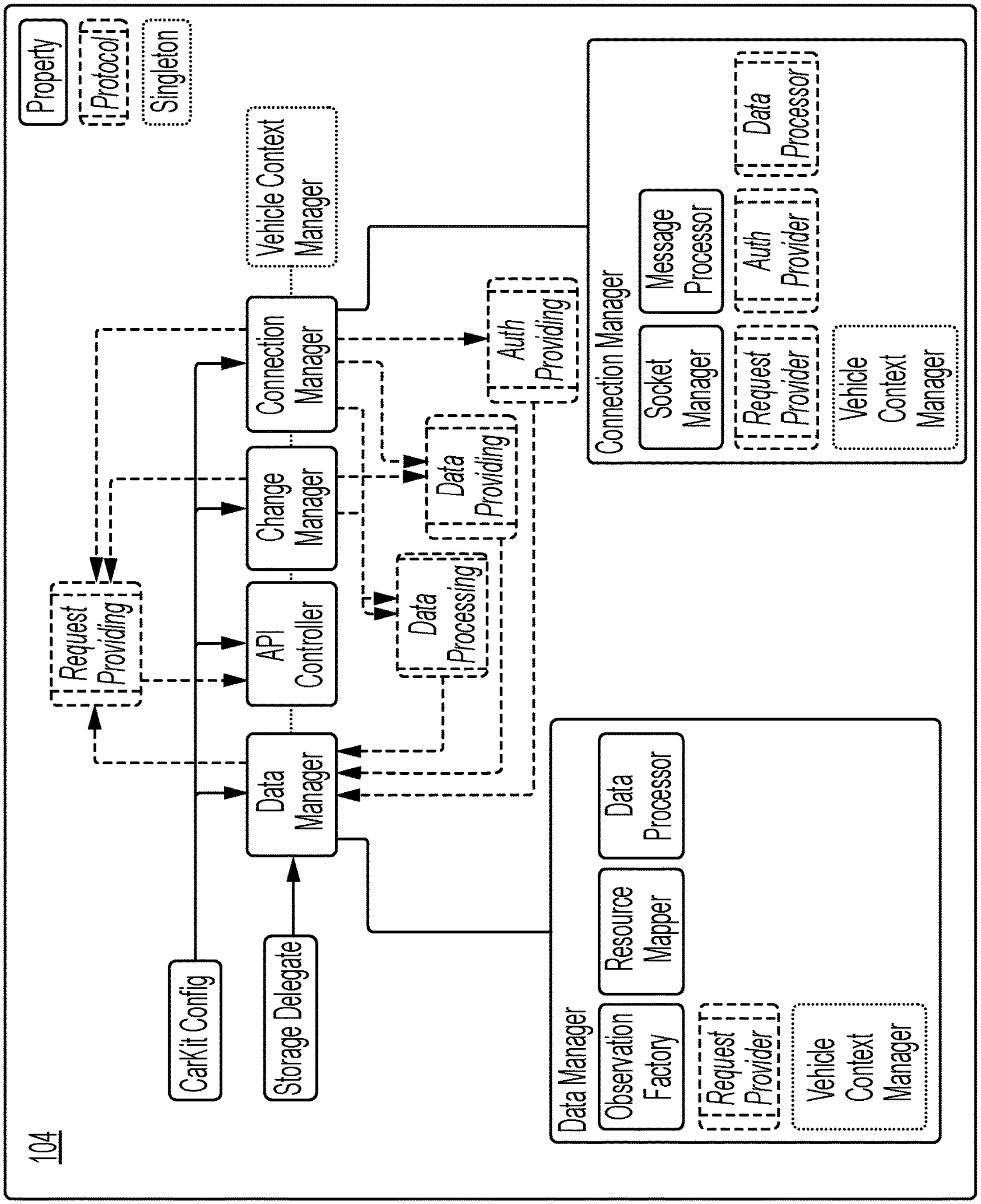
FIG. 3 is a schematic diagram of a computer program according to an embodiment.

Program 104 can be configured to include different components to facilitate access to one or more features of vehicle 100 that may be provided with a default configuration by the manufactures of vehicle 100 and may be configured for changes or customization by the user of vehicle 100. For example, program 104 can include a Data Manager, a Connection Manager, an API Controller, and a Change Manager, as illustrated in FIG. 3, for example. The Data Manager can be configured, for example, to provide, process, and update an RSI Request-Response Interface authorization and RSI resource mapping. The Connection Manager can be configured, for example, to check network conditions through a network controller, re-check connection when network conditions change, search for an infotainment web interface protocol, such as the Volkswagen Infotainment Web Interface ("VIWI") RSI service, for example, handle authentication, collect initial information (e.g., vehicle data) about different components of the vehicle 100, and process updates to vehicle data requested by the user of vehicle 100.

Program 104 can be configured to access a list of available features of the vehicle 100, including but not limited to initial or default values of the available features of the vehicle 100, before allowing the user of vehicle 100 access to modify or customize the available features of the vehicle 100. Once program 104 has gathered and parsed the initial vehicle data, program 104 can monitor for any changes to the initial vehicle data. For example, program 104 can open a WebSocket API as a two-way interactive communication session between the user's interface of program 104 and a server connected to a two-way interactive communication session between the user's browser and a server to observe, process, and store any and all changes by the user to the initial vehicle data. After the user's modifications to any of the available features of the vehicle 100 are processed and stored in the memory 112 of program 104, program 104 can be configured to synchronize the modified features of the vehicle 100 with the corresponding system or component of the vehicle 100.

In addition, program 104 can be configured to auto detect any smart devices (e.g., smart phones, smart watches, tablets, etc.) that are compatible with program 104, and that may be accessible within the vehicle 100, and auto connect with these devices as soon as they are setup, without the necessity for the user to set up these devices each time. As another example, program 104 can connect to a smart device via a direct connection application programming interface (API).

Program 104 can be configured to capture sound within the vehicle interior 109 using microphone 118 of the mobile device 200, for example. The sound within the vehicle interior can be caused by an impact of the user (e.g., striking by a hand, tapping with fingers, tapping with feet, etc.) on a component 111 of the vehicle interior 109. The sounds captured by microphone 118 are transmitted to program 104 installed on the mobile device 200, which analyzes the characteristics of the captured sounds. The characteristics of the captured sounds may include, but are not limited to, the direction of the sound or the source of the sound (e.g., which component 111 of the vehicle interior 109 the sound comes from), or parameters of the captured sound related to frequency, amplitude, volume, tempo, beats per minute ("BPM"), etc. . . . The program 104 can apply a trained sound model to the captured sounds. The trained sound model can be part of the AI model 106 or part of a different trained sound model programmed in the software application 104 running on the mobile device 200.

The trained sound model can be configured to apply a Fourier transform analysis to the captured sounds to determine the frequency/amplitude of the sound, the direction of the sound, or the source of the sound (e.g., whether the sound comes from the steering wheel of the vehicle, etc.) or distinguishing parameters of the sound (e.g., frequency, beats, tempo, etc.), for example. For example, the analysis could encompass the steps of comparing the captured user-generated sound with similar pre-recorded user-generated sounds to determine the origin of the captured sound. For example, the software application 104 can identify that the user is drumming on the steering wheel by comparing the captured sound of drumming on a steering wheel with a pre-recorded sample of sound of drumming on the steering wheel. The analysis may rely on the frequency, wavelength, pitch, etc. of the captured sound to perform the analysis. It should be understood that the analysis may involve comparing data files representing sound as opposed to the sound itself. Further details of a trained sound model that applies a Fourier transform analysis to the captured sounds are described in U.S. Patent Application Publication No. 2014/0328487 and U.S. Patent Application Publication No. 2009/0287323, which are incorporated by reference herein in their entireties and for all purposes.

Alternatively, sounds caused by an impact of the user (e.g., striking by a hand, tapping with fingers, tapping with feet, etc.) on a component 111 of the vehicle interior 109 can be captured by the microphone 118 of the infotainment system 107 of the vehicle 100. The sounds captured by microphone 118 can be transmitted to the processor of the vehicle computer 102, which can analyze the characteristics of the captured sounds in a similar way. After the program 104 analyses and processes the sounds caused by an impact of the user (e.g., striking by a hand, tapping with fingers, tapping with feet, etc.) on a component 111 of the vehicle interior 109, the program 104 assigns the identified user-generated sound to a particular recorded drum sound (e.g., bass drum sound). The recorded drum sound may be the sound of a tom drum, floor tom drum, high tom drum, mid tom drum, snare drum, bass drum, steel drum, hand drum, cymbal, etc. For example, the sound of striking by a hand could be assigned to a bass drum, the sound of tapping with fingers could be assigned to a high tom drum, the sound of tapping with feet could be assigned to a bass drum, etc.

The program 104 has saved in the memory 112 a plurality of different recorded drum sounds. As an example, saved in the memory 112 of the program 104 is a recorded bass drum sound that is assigned to the sound of a user striking the steering wheel by hand, a recorded snare drum sound that is assigned to the user tapping with fingers on the center console or tapping with feet on the floor, etc.

The user can also manually train the program 104 on the various tapping sounds generated by the user and their corresponding drum sounds.

The program 104 then plays the recorded drum sound, in real time, over the speakers 117 of the vehicle.

The program 104 can play the recorded drum sound over the speakers 117 of the vehicle 100 as an overlay for music currently being played over the speakers 117 of the vehicle 100. It is noted that the computer program 104 runs at a sufficient speed such that any time lag between a user's tap and a generated drum sound may be nearly imperceptible to the listener. For example, the music currently being played over the speakers 117 of the vehicle 100 can be music played by the vehicle infotainment system 107 or by different apps for streaming and playing music. The different music apps can run on the mobile device 200 or on the vehicle computer 112.

Alternatively, the program 104 can play the recorded drum sound over the speakers 117 of the vehicle 100 as an independent drum sound and without overlaying the drum sound over music.

Figure 4:
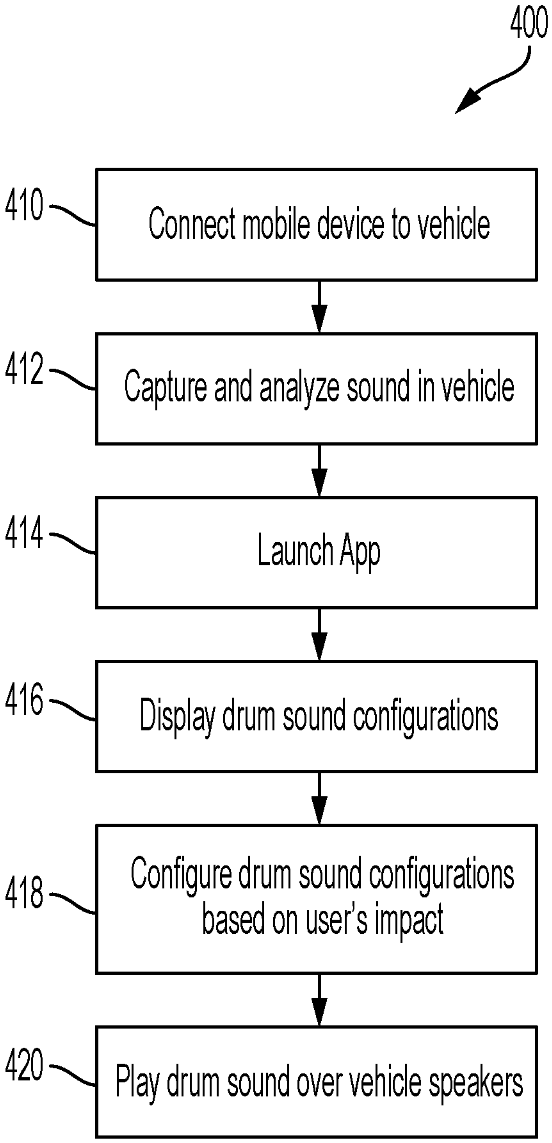
FIG. 4 is a flowchart depicting an overall method for capturing sounds caused by a user of a vehicle and transmitting corresponding sounds over speakers of the vehicle.

FIG. 4 is a flowchart depicting an overall method 400 for capturing sounds caused by a user of a vehicle and transmitting corresponding sounds over speakers 117 of the vehicle 100. The user of the vehicle 100 can be a driver of the vehicle 100 or a passenger in the vehicle 100.

At the outset it is noted that method 400 uses mobile device 200 along with vehicle 100 to accomplish method 400, however, it should be understood that vehicle computer 102 of vehicle 100 may be omitted and the steps of method 400 may be completed using only mobile device 200. Alternatively, mobile device 200 may be omitted and the steps of method 400 may be completed using only vehicle computer 102 of vehicle 100.

At step 410 of method 400, mobile device 200 connects to vehicle 100 in either a wired or wireless manner, as described above. If the steps of method 400 are completed by vehicle 100 itself (and without the assistance of mobile device 200), then this step may be omitted.

Optionally, after the connection between the mobile device 200 and the vehicle 100 is established, program 104 can initiate an authentication of the mobile device 200 and/or the vehicle 100. The authentication can be performed using known methods, such as Transport Layer Security ("TLS") 1.2 security protocol, public pinning hash, local certificate pinning, PIN numbers that can be entered by the user or QR codes that can be scanned by the mobile device 200, for example. Further functionality of program 104 can be disabled until after the mobile device 200 and/or the vehicle 100 successfully complete the authentication process (e.g., the mobile device 200 confirms that the saved user and vehicle information is stored in the vehicle 100).

At step 412 of method 400, the microphone 118 of mobile device 200 or microphone 118 of the infotainment system 107 of the vehicle 100 captures sound within the vehicle interior 109, as described above. The sound within the vehicle interior 109 can be caused by an impact of the user (e.g., striking by a hand, tapping with fingers, pressure applied by finger, fist, or palm, etc.) on a component 111 of the vehicle interior 109. The sounds captured by microphone 118 are transmitted to program 104 installed on the mobile device 200, which analyzes the characteristics of the captured sounds. The characteristics of the captured sounds may include, but are not limited to, the frequency of the sound, the direction of the sound or the source of the sound (e.g., which component 111 of the vehicle interior 109 the sound comes from), or parameters of the captured sound related to the tempo of the music, such as beats per minute ("BPM"), for example. The program 104 can apply the trained sound model described above to identify the user-generated sound and assign that user-generated sound to a recorded drum sound.

At step 420, without any user intervention, program 104 associates the captured sounds (i.e., sounds caused by an impact of the user on a component 111 of the vehicle interior 109, and which were analyzed by the Fourier transform analysis (for example)) with at least one recorded drum sound, and plays the recorded drum sound, in real time, over the speakers 117 of the vehicle 100. The program 104 can play the recorded drum sound over the speakers 117 of the vehicle 100 as an overlay for music currently being played over the speakers 117 of the vehicle 100. For example, the music currently being played over the speakers 117 of the vehicle 100 can be music played by the vehicle infotainment system or by different apps for streaming and playing music. The different music apps can run on the mobile device 200 or on the vehicle computer 112.

Alternatively, the program 104 can play the generated recorded sound over the speakers 117 of the vehicle 100 as an independent drum sound.

Steps 414, 416 and 418 describe an optional process where a user can customize and configure the program 104.

At optional step 414, if the program 104 is not yet launched, the user (e.g., driver or passenger of vehicle 100) launches program 104 on mobile device 200 or on vehicle computer 102. Step 414 may occur either prior to a vehicle trip or during the vehicle trip.

At optional step 416, program 104 displays a plurality of different user-configurable drum sound configurations. For example, each of the user-configurable drum sound configurations can include, but is not limited to, a plurality of different configurable drum sounds (e.g., bass drum sound, snare drum sound, etc.).

Before displaying to the user, in step 416, the internal listing of user-configurable drum sound configurations, the listing may be sorted, arranged and organized in a certain fashion. As one example for sorting the listing, program 104 checks for the most recently used or the most often used drum sound configurations and automatically organizes the appearances of the drum sound configurations such that the most recently used or the most often used drum sound configurations appear at the top of the list.

As another example, program 104 can recognize the user of the vehicle 100 (e.g., in case multiple users use the same vehicle 100) and can automatically display the drum sound configurations that were most recently used or are most often used by the recognized user.

At optional step 418, program 104 receives from the user (e.g., driver or passenger) of the vehicle 100 user input associating, in program 104, each of the user-configurable drum sound configurations with a different impact of the user (e.g., striking by a hand, tapping with fingers, etc.) and/or impact by the user on a different component 111 (e.g., steering wheel, center console, floor, etc.) of the vehicle interior 109. As an example, the user can configure in, and save in the memory 112 of, the program 104 a bass drum sound as sound corresponding to the user's striking the steering wheel by hand, snare drum sound corresponding to the user's tapping with fingers on the center console or the floor, etc. The user input can be in the form of the user selecting an icon or pressing a button on the touchscreen 114 of the user interface of program 104. Alternatively, the user input can be in the form of a voice command by the user over an audio system of the mobile device 200. In certain embodiments, for example, Apple Siri can be expanded to enable user input, selection, and modification of vehicle functions and external functions through the program 104.

The user-configurable drum sound configurations may be saved in the memory 112 of the mobile device 200, for example. The user's selection can be saved in the memory 112 of the mobile device 200 for either current use or later use.

The step 418 of configuring the plurality of user-configurable drum sound configurations based on the user's preferences can be executed by program 104 running on the smartphone 200 or on the vehicle computer 100, in real time between the smartphone 200 and the infotainment system of the vehicle 100. The method thereafter proceeds to step 420, which is described above.

It should be understood that method 400 is not limited to any particular step or sequence of steps.

The step of configuring the plurality of user-configurable drum sound configurations based on the user's preferences can be executed by program 104 running on the vehicle computer 100 or on the smartphone 200, in real time between the smartphone 200 and the infotainment system of the vehicle 100.

In the context of the present description, the functions of program 104 may be carried out by a processor. The processor can be understood to mean a machine or an electronic circuit, for example. In particular, a processor can be a central processing unit (CPU), a microprocessor or microcontroller, for example an application-specific integrated circuit or digital signal processor, possibly in combination with a data storage unit for storing program commands, etc. Additionally, a processor can be understood to be a virtual processor, a virtual machine or soft CPU. The program 104 may be stored in the memory of the machine.

It will be understood that the operational steps are performed by the computers or processors described herein upon loading and executing software code or instructions which are tangibly stored on a tangible, non-transitory computer readable storage medium, such as on a magnetic medium, e.g., a computer hard drive, an optical medium, e.g., an optical disc, solid-state memory, e.g., flash memory, or other storage media known in the art. Thus, any of the functionality performed by the computers or processors described herein described herein is implemented in software code or instructions which are tangibly stored on a tangible, non-transitory computer readable storage medium. Upon loading and executing such software code or instructions by the computers or processors, the computers or processors may perform any of the functionality of the computers or processors described herein, including any steps of the methods described herein.

The term "software code" or "code" used herein refers to any instructions or set of instructions that influence the operation of computers or processors. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

It will also be understood that the terms and expressions used herein have the ordinary meaning as is accorded to such terms and expressions with respect to their corresponding respective areas of inquiry and study except where specific meanings have otherwise been set forth herein. The terms "comprises," "comprising," "includes," "including," or any other variation thereof, are intended to cover a non-exclusive inclusion, such that a process, method, article, or apparatus that has, comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A computer-implemented method for capturing user-generated sounds caused by a user of a vehicle and transmitting corresponding recorded drum sounds over speakers of the vehicle, said method comprising the steps of:

(a) connecting a software application to a vehicle network;

(b) capturing at least one user-generated sound caused by an impact of the user on a component of a vehicle interior;

(c) transmitting the captured user-generated sound to a trained sound model of the software application;

(d) using the trained sound model of the software application to (i) analyze the captured user-generated sound, (ii) associate the captured user-generated sound with a pre-recorded sound from among a plurality of pre-recorded sounds saved in a memory, the plurality of pre-recorded sounds corresponding to impacts on different components of the vehicle interior, and (iii) associate the pre-recorded sound with at least one user-configurable recorded drum sound configuration from among a plurality of user-configurable recorded drum sound configurations saved in the memory; and (e) playing the at least one recorded drum sound configuration over the speakers of the vehicle.

2. The computer-implemented method of claim 1, wherein the step of analyzing the captured user-generated sound comprises comparing the captured user-generated sound with the pre-recorded sounds to determine a best fit between the captured user-generated sound and one of the pre-recorded sounds.

3. The computer-implemented method of claim 1, wherein each of the user-configurable recorded drum sounds represents a specific user-generated sound corresponding to the impact of the user on the component of the vehicle interior.

4. The computer-implemented method of claim 1, wherein at least one of the plurality of user-configurable drum sound configurations is associated with the specific sound corresponding to the impact of a hand of the user striking the component of the vehicle interior.

5. The computer-implemented method of claim 1, wherein at least one of the plurality of user-configurable drum sound configurations is associated with the specific sound corresponding to the impact of a finger of the user tapping the component of the vehicle interior.

6. The computer-implemented method of claim 1, wherein at least one of the plurality of user-configurable drum sound configurations comprises a snare drum sound.

7. The computer-implemented method of claim 1, wherein the component of the vehicle interior comprises at least one of a steering wheel, a center console, or a floor of the vehicle.

8. The computer-implemented method of claim 1, wherein the recorded drum sound configuration is played over the speakers of the vehicle in real time.

9. The computer-implemented method of claim 1, wherein the recorded drum sound configuration is played over the speakers of the vehicle as an independent drum sound.

10. The computer-implemented method of claim 1, wherein the recorded drum sound configuration is played over the speakers of the vehicle as an overlay for music currently being played over the speakers of the vehicle.

11. The computer-implemented method of claim 1, wherein the recorded drum sound configuration is played on an infotainment system of the vehicle.

12. The computer-implemented method of claim 1, wherein the software application is installed on a mobile device and the impact of the user on the component of the vehicle interior is captured by a microphone of the mobile device.

13. The computer-implemented method of claim 1, wherein the impact of the user on the component of the vehicle interior is captured by a microphone of an infotainment system of the vehicle.

14. A computer for capturing user-generated sounds caused by a user of a vehicle and transmitting corresponding recorded sounds to speakers of the vehicle, the computer comprising:

(a) a receiver/transmitter for connecting to a vehicle network;

(b) a microphone for capturing at least one user-generated sound caused by an impact of the user on a component of a vehicle interior;

(c) a processor having a trained sound model for (i) receiving the captured user-generated sound from the microphone, (ii) analyzing the captured user-generated sound, (iii) associating the captured user-generated sound with a pre-recorded sound from among a plurality of pre-recorded sounds saved in a memory of the computer, the plurality of pre-recorded sounds corresponding to impacts on different components of the vehicle interior, and (iv) associating the pre-recorded sound with at least one user-configurable recorded drum sound configuration from among a plurality of user-configurable recorded drum sound configurations saved in the memory; and (d) transmitting the at least one user-configurable recorded drum sound configuration to the speakers of the vehicle.

15. A vehicle comprising the computer of claim 14.

16. A smartphone comprising the computer of claim 14.

* * * * *